United States Patent
Henneken et al.

(10) Patent No.: US 7,029,421 B2
(45) Date of Patent: Apr. 18, 2006

(54) METHOD FOR OPERATING AN AUTOMATIC GEARBOX ON A MOTOR VEHICLE

(75) Inventors: Markus Henneken, Kressbronn (DE); Friedemann Jauch, Tettnang (DE); Franz-Josef Schuler, Kressbronn (DE); Thomas Mauz, Langenargen (DE); Michael Kiefer, Tettnang (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 28 days.

(21) Appl. No.: 10/478,358

(22) PCT Filed: May 18, 2002

(86) PCT No.: PCT/EP02/05506

§ 371 (c)(1), (2), (4) Date: Nov. 21, 2003

(87) PCT Pub. No.: WO02/097308

PCT Pub. Date: Dec. 5, 2002

(65) Prior Publication Data

US 2004/0266583 A1    Dec. 30, 2004

(30) Foreign Application Priority Data

May 25, 2001  (DE) ................................ 101 25 698

(51) Int. Cl.
*F16H 59/36* (2006.01)
*F16H 59/48* (2006.01)

(52) U.S. Cl. .................... 477/120; 477/46; 477/68; 701/52

(58) Field of Classification Search ................ 477/34, 477/37, 46, 64, 68, 115, 120; 701/51, 52
See application file for complete search history.

(56) References Cited

U.S. PATENT DOCUMENTS

| 5,396,420 | A |   | 3/1995  | Graf ........................ 364/424.1 |
| 5,591,102 | A | * | 1/1997  | White et al. ................. 477/107 |
| 5,676,619 | A | * | 10/1997 | Ohashi et al. ................ 477/98 |
| 5,857,161 | A |   | 1/1999  | Zeilinger et al. ............. 701/51 |
| 5,868,033 | A |   | 2/1999  | Nishino et al. ........... 74/335 R |
| 5,919,244 | A |   | 7/1999  | Danz et al. .................... 701/57 |
| 6,080,083 | A | * | 6/2000  | Nishino ..................... 477/125 |
| 6,363,805 | B1 |  | 4/2002  | Marchart ..................... 74/335 |
| 6,487,485 | B1 |  | 11/2002 | Henneken et al. ............ 701/56 |
| 6,676,566 | B1 | * | 1/2004  | Ohashi et al. ............... 477/115 |

FOREIGN PATENT DOCUMENTS

| DE | 43 11 886 A1 | 10/1994 |
| DE | 197 09 506 A1 | 11/1997 |
| DE | 198 49 062 A1 | 4/2000 |
| DE | 299 23 165 U1 | 6/2000 |
| FR | 2 699 978 | 7/1994 |

(Continued)

*Primary Examiner*—Ha Ho
(74) *Attorney, Agent, or Firm*—Davis & Bujold, P.L.L.C.

(57) ABSTRACT

A method is described for operating an automatic transmission in which a command for changing a current ratio of the automatic transmission is generated when achieving preset operating states of the vehicle automatically or by manual input in a manual shifting mode, the activated manual shifting mode being preferred to an automatic shifting mode. The manual shifting mode is quit when a current vehicle speed is less than a threshold value, or when a longitudinal acceleration of the vehicle is within a defined range, a lateral acceleration is less than a threshold value and a driver type evaluation counter is less than a limiting value.

20 Claims, 1 Drawing Sheet

FOREIGN PATENT DOCUMENTS

Figure 1:
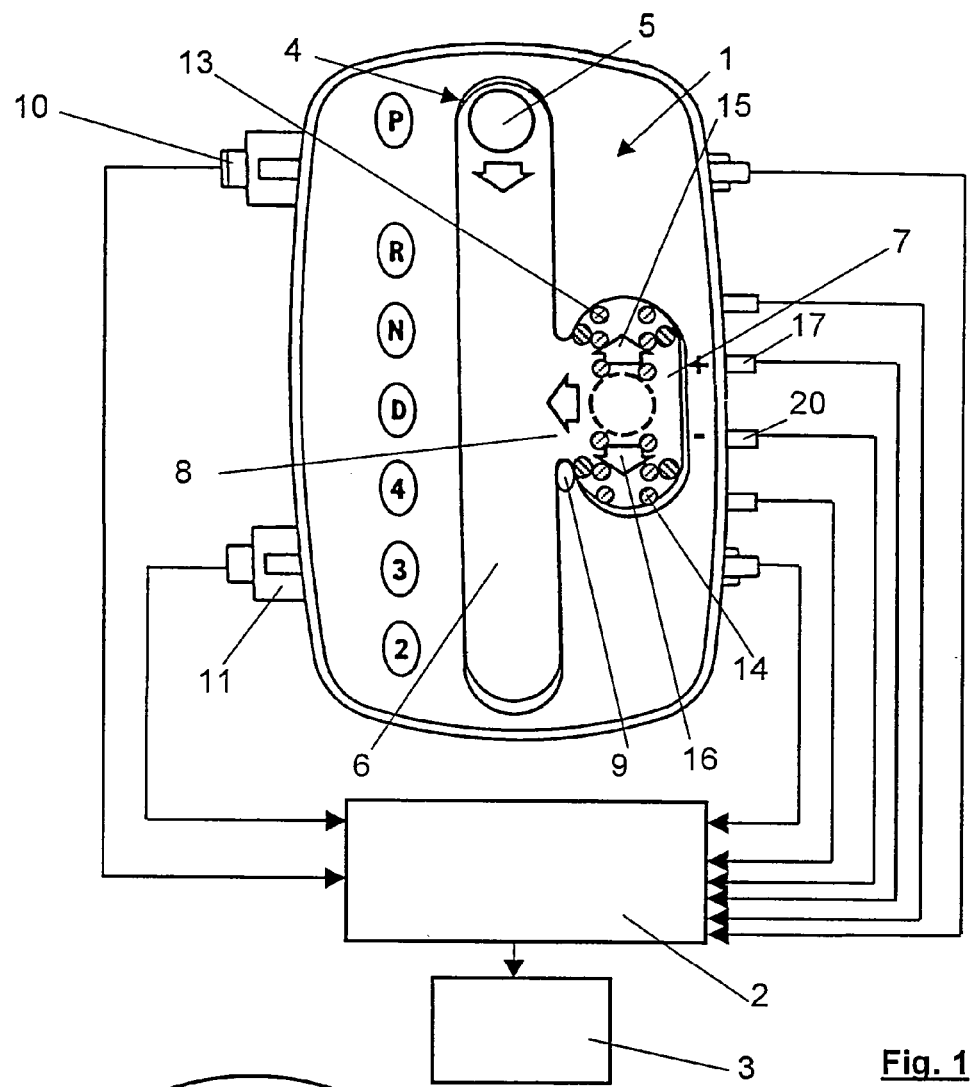

| | | | |
|---|---|---|---|
| JP | 2000-2328 | * | 1/2000 |
| JP | 2002-89670 | * | 3/2002 |
| JP | 2004-60734 | * | 2/2004 |
| WO | 96/28317 | | 9/1996 |

* cited by examiner

METHOD FOR OPERATING AN AUTOMATIC GEARBOX ON A MOTOR VEHICLE

This application is a national stage completion of PCT/EP02/05506 filed May 18, 2002 which claims priority from German Application Serial No. 101 256 98.1 filed May 25, 2001.

FIELD OF THE INVENTION

The invention relates to a method for operating an automatic transmission of a motor vehicle in which a command for changing a current ratio of the automatic transmission upon reaching preset operating state of the vehicle, is automatically generated by manual input in a manual shifting mode, the activated manual shifting mode being preferred to an automatic shifting mode.

BACKGROUND OF THE INVENTION

DE 43 11 886 A1 has disclosed a device and a method by means of which an automatically shifting transmission can be operated with one selector device or a first automatic operating mode and one selector device for a second operating mode controlled by the driver which is also called a manual shifting mode. Between the automatic shifting mode and the manual shifting mode, it is possible with the first selector device to shift by moving a selector lever of the first selector device from a position D to a position M or by a shifting signal being delivered by means of a second selector device which can be designed as a rocker or any other shifting means.

It is, likewise, provided that by means of both selector devices a change from the manual shifting mode to the automatic shifting mode be possible, the selector lever having to be moved from the position M to a position D or a signal of the second selector device has to abut over a preset time period in order to produce a change of the operating mode.

If the vehicle reaches operating limits detectable for the device in which, for example, an overspeeding or a stalling of the engine occurs for the precisely introduced gear of the transmission, a gear shift is triggered even without a shift command of the driver in order to bring the vehicle back to the admissible operating limits. It is further provided that after lapse of a preset period of time without a new manual shifting command of the driver, the manual shifting mode is quit and the automatic shifting mode activated.

In DE 197 09 506 A1 has been described an automatic transmission of a motor vehicle in which a manual shifting instead of an automatic shifting can be carried out. In an automatic shifting, a controller selects an adequate reduction ratio according to a vehicle speed and a degree of opening of throttle valve.

If the driver wishes a manual shifting and moves a shift lever to an M range position, the controller designs a control program in order to carry out a manual shifting operation in the M range. Depending on preset operating states of the vehicle, particularly of the engine and of the automatic transmission, it is determined in a manual shifting mode whether critical operating states have been reached which require an automatic shifting. If a corresponding question results in that such critical operating states have been reached, in a very low speed of the vehicle, for example, a forced downshift is automatically introduced and in case of a high speed of the vehicle, which goes along with a high rotational speed of the engine, a forced upshift is automatically carried out.

Those solutions known from the prior art for change between an automatic shifting mode and a manual shifting mode have, however, the disadvantage that they proceed time gated and only take into consideration—if at all—certain operating situations. Besides, they afford only insufficient shifting comfort to the driver.

The problem of insufficient shifting comfort exists in those solutions known from the practice in which, together with a selector lever movable in a selector lever gate in two directions (+/−) for upshifting or downshifting, a shift control is provided as an added selector device for so-called "inching shift" in which it is possible to shift by tapping an adequate sensor, for example, on a steering wheel, to the next lower or next higher speed. By actuating one such inching switch to the steering wheel, if the driver activates the manual shifting mode in the solutions known from the practice for changing to the automatic operation, he has to move usually the selector lever in the selector lever gate for manual operation and reset it again out of said position.

The problem on which this invention is based is to make a method for control of an automatically shifting vehicle transmission available with which an individual adaptation of the control of a vehicle transmission to the existing operating situation and driving style of the driver concerned can be carried out while ensuring a good driving stability of the vehicle and with greater operating comfort for the driver.

This problem is solved according to the invention with a method having the features of claim 1.

SUMMARY OF THE INVENTION

The inventive method offers the advantage that the exit of the manual shifting mode is adapted to the existing operating situation and the existing driver type of the vehicle guide, where the manual shift operating mode is quit when a current vehicle speed is lower than a threshold value or a longitudinal acceleration of the vehicle is within a defined range and a lateral acceleration of the vehicle is lower than a threshold value and a driver type evaluation counter is lower than a limiting value.

When inventive exit from the manual shifting mode falls below a minimum vehicle speed, it is possible, for example, to take into account the operating situation in which the driver, during a rolling out of the vehicle, forgets that he is in the manual operation and thus should shift. On the other hand, with the criteria of the longitudinal and lateral accelerations, the same as of the driver type evaluation counter, it can be prevented that, in case of a very sporting driver, the change from manual operation to the automatic shifting mode is too speedy. The exit via the driving activity corresponding to the driver type evaluation is essentially better adapted to the driver than, for example, the exit known from the prior art over a preset period of time.

The inventive method serves at the same time to increase the safety since, by taking into account the longitudinal acceleration and the lateral acceleration of the vehicle, the same as the current vehicle speed, a change of the shifting mode is suppressed in critical driving situations, which otherwise could result in an imperilment of the driving stability, if the occasion arises.

The inventive method has the additional advantage that a greater shifting comfort is offered to the vehicle driver by an automatic change from manual shifting mode to automatic shifting mode being effected when the driver has activated the manual shifting mode by actuating an inching switch on the steering wheel, for example. An additional actuation of the selector device by the driver for reversal to the automatic shifting mode can thus be omitted in the presence of an uncritical driving situation defined by the current vehicle speed, the longitudinal acceleration of the vehicle, the lateral acceleration of the vehicle and the driver type evaluation counter.

It is particularly advantageous if the manual shifting mode is deactivated when there is no more manual input via the selector device. Since then it can be assumed that the driver would not be actively inclined to engage in the selection of the reduction ratio, if the automatic shifting mode was more comfortable for the driver and besides more consumption optimized should be active.

BRIEF DESCRIPTION OF THE INVENTION

Figure 2:
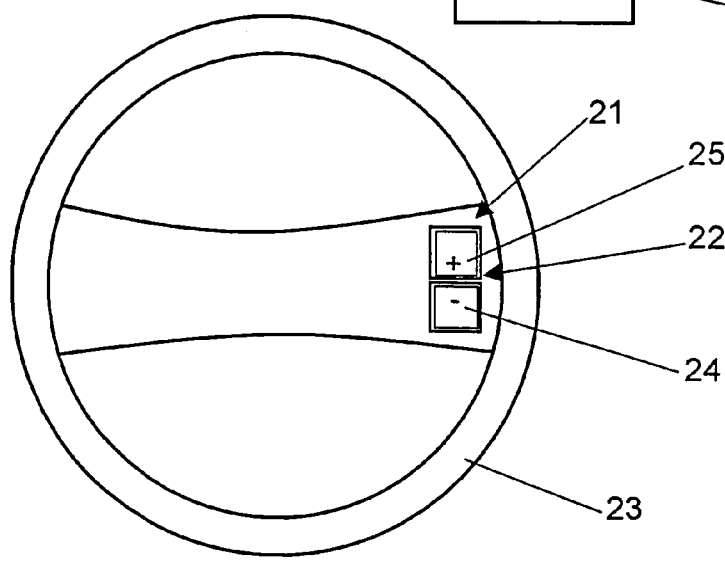

The invention will now be described, by way of example, with reference to the accompanying drawing in which:

FIG. 1 is a diagrammatic representation of a shifting device for an automatic transmission of a motor vehicle by an electronic control unit operable by the inventive method; and FIG. 2 is a selector device connected with the shifting device of FIG. 1 which is designed as inching push button on a multifunction steering wheel.

DETAILED DESCRIPTION OF THE INVENTION

FIG. 1 shows a shifting mechanism 1 for an automatic transmission 3 of a motor vehicle which is operated by an electronic control unit 2, the automatic transmission 3 being only symbolically indicated in FIG. 1. The shifting mechanism 1 has a first shifting device 4 for a dynamic shift program in which by means of selection of a shifting position P for parking the vehicle, a shifting position R for reverse drive, a shifting position N for the idling speed and a shifting position D for automatic forward drive, according to input of an adaptive transmission control, different gears to be automatically engaged can be preselected. For this purpose serves a selector lever 5 acting as selector device which is movable in a first shifting gate 6 where sensors are arranged for the above described shifting positions. In said first shifting gate 6, there are provided, together with the shifting positions P, R, N and D, still other shifting positions "4" for a fourth speed, "3" for a third speed and "2" for a second speed.

Together with the first shifting gate 6 for an automatic shifting mode. A manual shifting mode is provided for carrying out a second shifting gate 7 disposed parallel with the first shifting gate 6 and in which the selector lever 5 can be shifted via a transverse gate 8. To detect the shifting movement between the first shifting gate 6 for automatic shifting mode and the second shifting gate 7 for manual shifting mode, a sensor 9, symbolically indicated in FIG. 1, is placed in the area of the transverse gate 8. The sensorially detected position of the selector lever 5 is issued as signals to the electronic control unit 2 via signal transmission devices 10, 11.

When the selector lever 5 is in the second shifting gate 7, it is retained by springs 13, 14 in a neutral middle position, shown in broken lines in FIG. 1, from which position it can be moved by manual actuation in a first direction indicated with an arrow 15 for an upshift and in a second direction for a downshift indicated with an arrow 16.

With the selector lever 5 moved in direction 15 for the upshift, it reaches a shifting position "+" for the upshift to the next higher speed in which a plus sensor 17 reacts and issues a corresponding signal to the electronic control unit 2. When the driver moves the selector lever 5 in opposite direction of motion 16 from the middle position in the second shifting gate 7 to a shifting position "−" for the downshift, a minus sensor 20 issues a corresponding downshift signal to the electronic control unit 2.

The shifting mechanism 1 has a second shifting device 21 shown in FIG. 2 in which an inching push button 22 is provided as selector device on a multifunction steering wheel 23. With the aid of the inching push button 22, which has one first push button 24 for downshift and one second push button 25 for upshifts, the driver, likewise, can manually demand an upshift or a downshift. The structural configuration of the push buttons 24 and 25 of the selector device 22 correspond to the generally known designs for push buttons.

In the shown shifting mechanism 1, the functionality of the selector lever 5 is thus increased in a manner such that the driver can select a manual operating mode, that is, he can actually preset a desired ratio by hand. When the driver changes to the second shifting gate 7, then the actual ratio or actual speed of the former shift program of the vehicle is taken over and maintained.

The driver can additionally activate the manual shifting mode via the multifunction steering wheel 23 and the inching switch 22 that serves as selector device.

During operation of the selector lever 5 and the operation of the inching push button 22, the transmission shifts are triggered via an inching pulse counter or inching meter. When the driver, for example, in the second shifting gate or manual gate 7 fastens the selector lever 5 in position "+" or "−" an inching pulse "+1" or "−1" is made operative. The inching pulses are added up or subtracted in the inching counter, via shifting commands, the inching counter being thereupon "worn out" until standing at "0". An upshift is commanded when the counter is above 0 while a downshift is commanded when the counter is below 0. After each upshift, the inching counter is again decreased by the value "1" and after each downshift the inching counter is increased by the value "1".

In manual shifting mode, an inching shift program is activated which contains coordinated gear and converter characteristic lines. According to said inching shift program, a forced shift is carried out, for example, when the driver performs no shifting, despite required shifting such as when decelerating down to parking of the vehicle. The inching operation is thus possible only in specific limits of the operation and when preset characteristic lines of the shift program are achieved forced shifting is effected. To this end, the inching shift program can have upper and lower limiting values which can be affected by the vehicle manufacturers concerned, the same as contain definitive maximum and minimum values with which is prevented, for example, damage to the transmission due to breaking of the clutch of a hydrodynamic torque converter at low rotational speed and high torque and subsequent closing of the converter clutch (of a hydrodynamic torque converter during extremely low rotational speeds).

In addition, the inching shift program can advantageously have a function for detecting a kick-down, a kick-down being detected, for example, when the accelerator pedal exceeds a maximum threshold. The kick-down evaluation proceeds as in the automatic shifting mode, but extends by an applicable time for which the kick-down state is held at maximum. With the input of the applicable time for the kick-down state, a protection for the transmission is achieved, since the kick-down rotational speed limits can optionally be exaggeratedly laid out and a shift is attained only after reaching said rotational speed, it is possible in this interval to exceed with damaging effect other limiting values in the transmission.

If the maximum accelerator pedal threshold is again fallen below but, at the latest after lapse of the applicable kick-down time, the kick-down state is quit. In order to detect kick-down again, the maximum accelerator pedal threshold must, in any case, be first fallen below again.

After quitting the kick-down state, a time lag is preferably started during which it is awaited whether the driver does not wish again to change to kick-down operation. Only after said time lag, which can amount from 0 second to 10 seconds, is an upshift admitted.

For the case than an inching shift triggered or commanded by the driver is not accomplished since said command has been detected as inadmissible, in the instant embodiment an optical signal is issued to the driver via a notice (not shown in detail in the drawing). But it is also possible that the driver is acoustically or haptically informed by an error in the inching operation or an inadmissible shifting command.

In case the driver has activated the manual shifting mode, via the inching switch 22, on the multifunction steering wheel 23, the exit from the manual shifting mode can comfortably occur without further engagement of the driver when the vehicle speed falls below a minimum threshold value. An exit from the manual shifting mode, likewise, takes place when a longitudinal acceleration of the vehicle is within a defined range and a transverse acceleration of the vehicle is less than a threshold value, the same as a driver evaluation counter being less than a preset limiting value thus meeting a driver type criterion which is explained in detail below.

Thus electronic control unit 2 comprises a driver type evaluation (not shown in detail) which is known per se and can comprise a kick-down evaluation, a kick-down evaluation and an operation detection, for example, whether a constant drive exists. The driver type is usually evaluated by means of counter values divided into defined ranges associated with a specific type of driver or driving style. The counter can have a high counter and a low counter, the high counter starting with a 0 value and continuously rising up to a counter value of 100, for example, and the under counter proceeding in opposite direction starts with the maximum counter value here of 100 and continuously descends down to the counter value of 0. The counter value ranges constitute sporting steps of a driver type or driver characteristics, the sportiveness of the movement of a vehicle being rated higher with ascending number of the counter value or of the counter. The driver is accordingly assumed to be economic driver with a counter value of 0 and very sporting driver with a counter value of 100. The driver type evaluation operates both in the automatic shifting mode and in the manual shifting mode.

For example, by actuating the inching push button 22 when the driver produces an activation of the manual shifting mode preferred to the automatic shifting mode, one offset value is added to the actual value of the driver evaluation counter. The driver type evaluation counter is then decreased during activated manual shifting mode without manual input until the driver type evaluation counter falls below a preset limiting value. With this limiting value a change is made again to the automatic shifting mode when in the interval the inching push button 22 has not been actuated in the multifunction steering wheel 23.

Assuming, for example, that in the automatic shifting mode during a change to manual shifting mode, the driver type evaluation counter has a value of 40, an offset of say 30 is added to the driver evaluation type counter so that there results a significantly higher driver activity altogether. After a brief interval which, for example, can be within one minute, the driver type evaluation counter will fall below a preset limiting value of 30, for example, at which the manual shifting mode again is quit. A change is made to the automatic shifting mode precisely at the moment when the driver's driving activity of the driver type evaluation counter expressing it corresponds in manual shifting mode to the driving activity in automatic shifting mode.

In the manual shifting mode, if the driver drives very sportingly without inching, the exit to the automatic shifting mode will accordingly last longer, since the decrease of driver type evaluation counter in a power-oriented mode of the driver is retarded compared to a consumption-oriented driving mode. For the case that the driver repeatedly actuates the manual selector, such as the inching push button 22, upon each actuation of the manual selector device, an offset is again added to the driver's activity of the driver evaluation counter, but at most up to the upper maximum limiting value of the driver type evaluation having here the value 100. The exit from the manual shifting mode will accordingly last longer during manual input which can occur via the selector lever 5 of the selector device in the manual gate 7 or via the inching push button 22.

If a change is now made from the manual shifting mode to the automatic shifting mode, when the manual shifting mode is quit, a shift program of the automatic shifting mode coordinated with the current value of the driver type evaluation counter is activated so that the existing shift program corresponds to the actual driving activity.

However, alternatively to this it can also be provided that in a change from the manual shifting mode to the automatic shifting mode a predefined shift program is activated with which the driving activity is firmly preset. In this case, it is opportune to preset a sporting program as a predefined shift program which offers a satisfactory spontaneity of the vehicle to the most ambitious driver.

For the case that prior to a change from the automatic shifting mode to the manual shifting mode a special shift program such as a sport program or a winter drive program had been activated, after quitting the manual shifting mode, said special shift program is again selected, that is, shift programs for sporting operation or winter drive operation are reestablished.

In the embodiment represented here, it is further provided that the manual shifting mode be quit when an inadmissibly high temperature of the vehicle transmission and/or of the engine has been found, there being selected shifting characteristic lines of the automatic shifting mode which lead to lowering the existing temperature.

Together with the above described automatic quitting of the manual shifting mode and changing to the automatic operation, in the embodiment shown, a change from manual to automatic shifting mode at the driver's wish obviously can also be manually implemented by actuating the selector lever 5 out of the manual gate or second shift gate 7 in direction of the first shift gate 6 for the automatic shifting mode.

It is here provided that when quitting the manual shifting mode a time lag is started which can be between 0 to 10 seconds, for example. Only after lapse of said time lag is a first change of ratio to the automatic shifting mode carried out. In this manner, the driver should avoid inadvertent changes to the automatic shifting mode.

It is evident that the inventive method is not tied to the above described structural design of the shifting device, but can also be used in any selector devices of different structural design for implementing a manual shifting mode and an automatic shifting mode.

REFERENCE NUMERALS 1 shifting mechanism
2 electronic control unit
3 automatic transmission
4 first shifting device
5 selector device, selector lever
6 first shifting gate
7 second shifting gate, manual gate
8 transverse gate
9 sensor
10 signal transmission device
11 signal transmission device
13 spring
14 spring
15 shift moving device of the selector device for upshift
16 shift moving device of the selector device for downshift
17 plus sensor
20 minus sensor
21 second shifting device
22 selector device, inching push button
23 multifunction steering wheel
24 first push button
25 second push button

The invention claimed is:

1. A method for operating an automatic transmission (3) comprising the steps of:
generating a command automatically or by manual input in a manual shifting mode, to change a current ratio of the automatic transmission (3) when achieving a preset operating state of the vehicle, an activated shifting mode being preferred to the manual shifting mode; and
ending the manual shifting mode when a current vehicle speed is less than a threshold value and ending the manual shifting mode when at least one of the three following criteria are met:
a longitudinal acceleration of the vehicle is within a defined range;
a lateral acceleration of the vehicle is less than the threshold value; and
a driver type evaluation counter is less than a limiting value.

2. The method according to claim 1, further comprising the step of deactivating the manual shifting mode when no other manual input is detected.

3. The method according to claim 1, further comprising the step of adding an offset value to the driver type evaluation counter during activation of the manual shifting mode by manual input.

4. The method according to claim 1, further comprising the step of adding an offset value to the driver type evaluation counter during the manual input in the manual shifting mode.

5. The method according to claim 1, further comprising the step of decreasing the driver type evaluation counter during the activated manual shifting mode without the manual input.

6. The method according to claim 1, further comprising the step of generating the manual input when a selector lever (5) is moved in a selector device to a manual gate (7) or an inching push button (22) of said selector device is actuated.

7. The method according to claim 1, further comprising the step of taking over and maintaining an actual ratio of a former shift program of the automatic transmission (3) during a change to the manual shifting mode.

8. The method according to claim 1, further comprising the step of selecting, after quitting the manual shifting mode, a special shift program before changing back to the manual shifting mode.

9. The method according to claim 1, further comprising the steps of carrying out a change from manual to automatic shifting mode by actuating said selector device (5,22), when the manual shifting mode is quit, a time lag after the lapse of which a first ratio change to the automatic shifting mode can be implemented.

10. The method according to claim 1, further comprising the step of activating in manual shifting mode, an inching shift program in which coordinated gear and converter characteristic lines are stored.

11. The method according to claim 10, further comprising the step of providing the inching shift program with a function for detecting a kick-down, a kick-down state being kept maximum for an applicable time.

12. The method according to claim 10, further comprising the step of issuing at least one of an acoustic, haptic and optical signal when said inching shift program detects an inadmissible shifting command from a driver.

13. The method according to claim 1, further comprising the step of terminating the manual shifting mode when an inadmissibly high temperature of the automatic transmission and of the engine is found, and selecting shifting characteristic lines of the automatic shifting mode which lead to lowering of the temperature of the automatic transmission and of the engine.

14. A method for operating an automatic transmission (3) comprising the steps of:
generating a command automatically or by manual input in a manual shifting mode, to change a current ratio of the automatic transmission (3) when achieving a preset operating state of the vehicle, the activated shifting mode being preferred to the manual shifting mode; and
encing the manual shifting mode when a current vehicle speed is less than a threshold value or when the three following criteria are met:
a longitudinal acceleration of the vehicle is within a defined range;
a lateral acceleration of the vehicle is less than the threshold value; and
a driver type evaluation counter is less than a limiting value, and
activating a shift program coordinated with the actual driver type evaluation counter during a change to the automatic shifting mode.

15. The method according to claim 14, further comprising the step in manual shifting mode of at least one of:
adding an offset value to the driver type evaluation counter during activation of the manual shifting mode by manual input,
adding the offset value to the driver type evaluation counter during the manual input in the manual shifting mode, and
decreasing the driver type evaluation counter during the activated manual shifting mode without the manual input.

16. The method according to claim 14, further comprising the step in manual shifting mode of at least one of:
- before changing back to the manual shifting mode, selecting a special shift program, and
- during a change to the manual shifting mode, taking over and maintaining an actual ratio of a former shift program of the automatic transmission (3) during a change to the manual shifting mode.

17. The method according to claim 14, further comprising the step in manual shifting mode of at least one of:
- activating in manual shifting mode, an inching shift program in which coordinated gear and converter characteristic lines are stored,
- providing the inching shift program with a function for detecting a kick-down, a kick-down state being kept maximum for an applicable time.

18. The method according to claim 14, further comprising the step of:
- issuing at least one of an acoustic, hapic and optical signal when an inching shift program detects an inadmissible shifting command from a driver.

19. The method according to claim 14, further comprising the step of at least one of:
- deactivating the manual shifting mode when no other manual input is detected, and
- terminating the manual shifting mode when an inadmissibly high temperature of the automatic transmission and of the engine is found, and selecting shifting characteristic lines of the automatic shifting mode which lead to lowering of the temperature of the automatic transmission and of the engine.

20. The method according to claim 14, further comprising the step of at least one of:
- generating the manual input when
  - one of a selector lever (5) is moved in a selector device to a manual gate (7) and
  - an inching push button (22) of said selector device is actuated, and
- carrying out the change from manual to automatic shifting mode by actuating said selector device (5, 22), and
- after a time lag after changing to the manual shifting mode, implementing a first ratio change to the automatic shifting mode.

* * * * *